Aug. 12, 1941.  P. A. NOXON ET AL  2,252,232
TELEGRAPH SELECTOR MECHANISM
Original Filed March 3, 1936   3 Sheets-Sheet 1
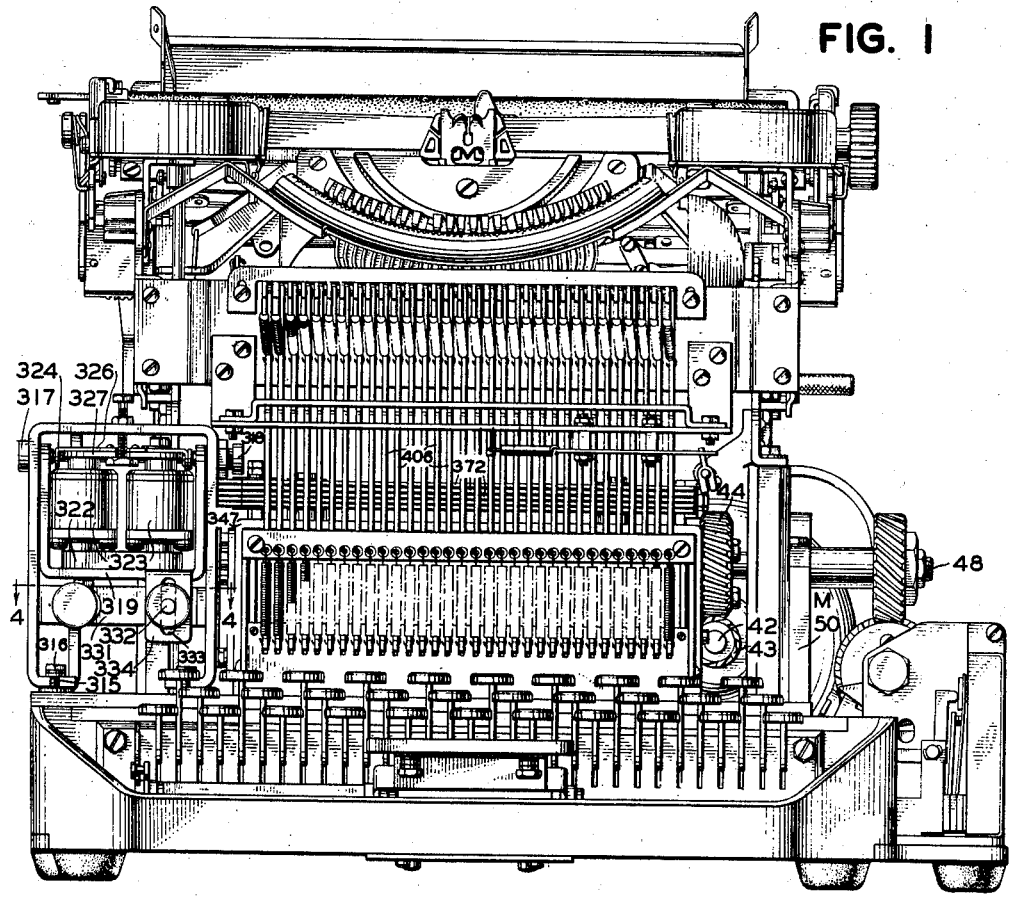
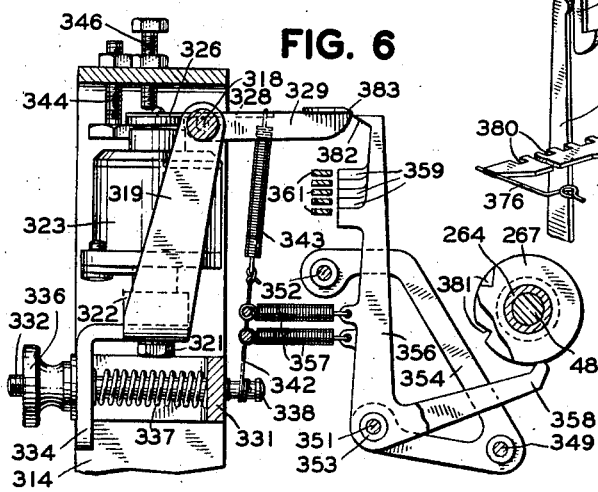
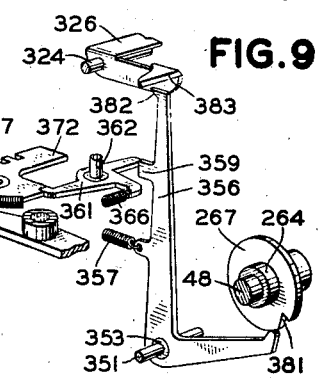
INVENTORS
P. A. NOXON
S. W. ROTHERMEL
F. J. MAUS
E. J. SORTORE
BY M. R. Marsh
ATTORNEY Aug. 12, 1941.                P. A. NOXON ET AL                2,252,232
                        TELEGRAPH SELECTOR MECHANISM
                Original Filed March 3, 1936      3 Sheets-Sheet 2

INVENTORS
                                           P. A. NOXON
                                           S. W. ROTHERMEL
                                      BY   F. J. MAUS
                                           E. J. SORTORE
                                           M. R. Marsh
                                           ATTORNEY

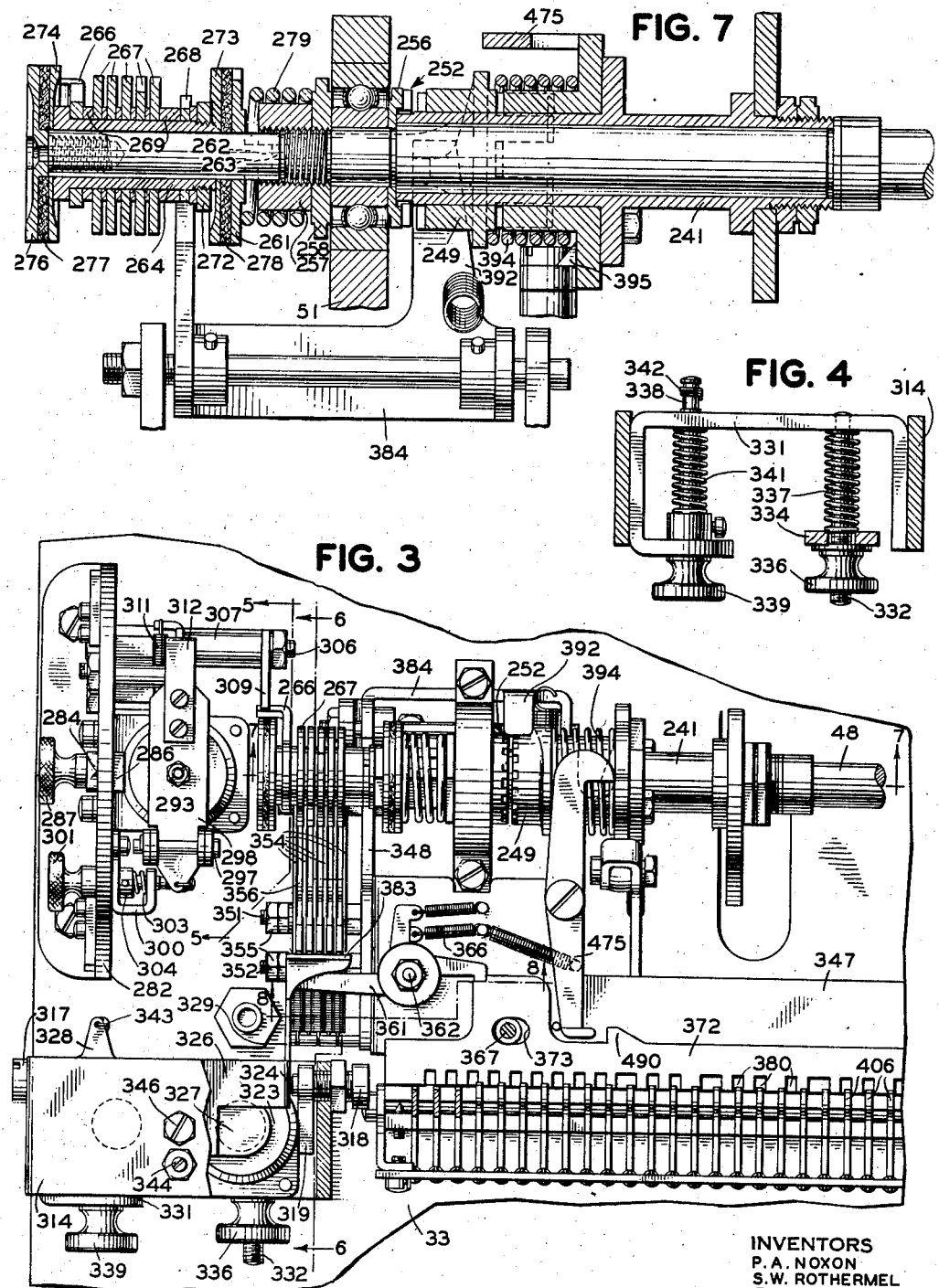

Patented Aug. 12, 1941

2,252,232

UNITED STATES PATENT OFFICE 2,252,232

TELEGRAPH SELECTOR MECHANISM

Paul A. Noxon, Tenafly, N. J., Samuel W. Rothermel, Lynbrook, N. Y., and Frank J. Maus, Paterson, and Emerson J. Sortore, Westfield, N. J., assignors to The Western Union Telegraph Company, New York, N. Y., a corporation of New York Original application March 3, 1936, Serial No. 66,906. Divided and this application August 17, 1938, Serial No. 225,364

10 Claims. (Cl. 178—27)

This invention relates primarily to a telegraph selector mechanism and more particularly to a selector mechanism responsive to received permutation groups of character signals for selectively controlling telegraph receivers and like apparatus wherein the signals are of the Boudot type, i. e. each character signal comprising permutations of current and no-current impulses or closed and open line conditions extending throughout a definite number, usually five, time intervals or units. Such selector mechanisms usually comprise a set of selectors equal in number to the selecting intervals of the signalling code which are operated in various combinations in accordance with the received signals. The novel features of the invention are hereinafter described as operating in conjunction with and under the control of start-stop type signals or those employed in simplex systems. In such systems a rotatable member or distributor at the receiving station is usually kept in step or in synchronism with the received groups of signals by start-stop mechanisms that initiate the rotation of the rotatable member in response to a starting line condition, preceding each group of signals and arrests the rotation thereof in response to a stopping line condition following each code group of impulses or during the intervals between successive groups.

This application is a division of a joint application of P. A. Noxon, S. W. Rothermel, F. J. Maus and E. J. Sortore filed March 3, 1936, Serial No. 66,906 and entitled Telegraph printer.

One of the objects of the invention is to provide an improved telegraph selector mechanism of simplified construction which requires a minimum amount of maintenance and which can be easily and cheaply manufactured.

Another object of the invention is to provide a selecting mechanism of novel design and improved efficiency capable of operating at a high rate of speed.

Another object of the invention is to provide a novel and improved orienting mechanism which allows the members of the associated selecting mechanism to cooperate with the selectors during the midportion or most effective portion of their respective signalling impulses.

Another object of the invention is to provide a selector mechanism wherein substantially all movement of a signal responsive member is prevented during substantially the entire time that each of the selectors are moving.

Another object of the invention is to provide a selector mechanism wherein the selectors are operative only during a portion of their respective signalling impulses.

These and other objects of the invention will be more apparent in the following detailed description thereof.

The preferred embodiment of the invention is adapted to control a telegraph printer of the type disclosed in a co-pending application of P. A. Noxon, et al., Serial No. 66,906 filed March 3, 1936, but it will be evident hereinafter that the selector mechanism is not limited to this particular printer but may be used to control various other types of receivers. In the invention a frictionally driven selector cam sleeve is released for rotation by a separate start magnet in response to the start impulse preceding each group of signals or character selecting impulses. The start magnet is mounted on a rotatable disc and by rotating the disc within predetermined limits the amount of rotation of the selector cam sleeve from a rest position before the selector cams thereon are operatively associated with the selectors can be varied. This compensates for variable length starting impulses which may be caused by line or other conditions and enables the selector cams to be associated with their respective selectors during the mid-portion or most effective portion of their respective signalling impulses. As the selector sleeve rotates, the selector cams thereon successively allow the selectors to approach a beveled baffle member in timed relation with the signalling impulses. The beveled member is controlled by the selector magnet and is positioned in one of two positions in accordance with the two types of impulses. In one position of the beveled member, it prevents substantially all movement of the selectors while in the other position it allows the selectors to trip associated latches. The latches in turn control a set of associated notched permutation or selector bars employed to selectively control the associated receiver.

A more thorough and clearer understanding of the invention may be had from the following detailed description thereof when taken in conjunction with the accompanying drawings in the latter of which Fig. 1 is an elevational view of the selector mechanism showing the manner in which it is associated with the above mentioned printer to control the same;

Fig. 3 is a plan of the selector mechanism and some of the elements of the associated printer;

Fig. 4 is a fragmentary horizontal sectional view taken substantially on line 4—4 of Fig. 1;

Fig. 6 is a fragmentary vertical sectional view taken substantially on line 6—6 of Fig. 3;

Fig. 7 is a vertical sectional view taken substantially on line 7—7 of Fig. 3, showing mainly the selector sleeve and cams;

Fig. 9 is a perspective view showing one of each of the elements of the selector mechanism.

Figure 5:
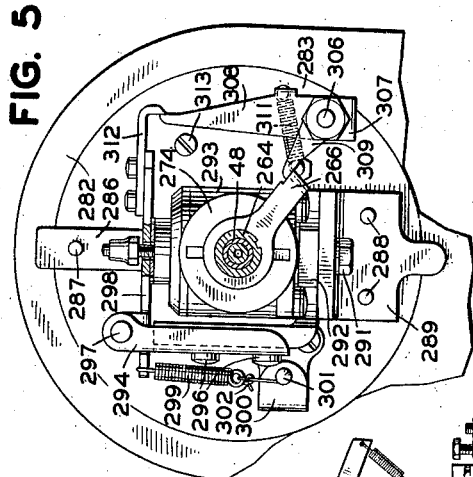
Fig. 5 is a vertical sectional view taken substantially on line 5—5 of Fig. 3, showing the start magnet and associated elements.

In the preferred embodiment of the invention, the electric motor which furnishes power for performing the various functions of the printer also furnishes power for the selector mechanism. The motor M, Figs. 1 and 2, has a shaft 42 to which is attached pinion gear 43 engaging with a helical gear 44 located thereabove. The gear 44 is attached to the main operating shaft 48 of the printer for rotation therewith and as the motor is constantly rotating, the shaft 48 also constantly rotates. The shaft 48 is suitably journaled adjacent its right hand end in a bearing post 50 and adjacent its left hand end in another bearing post 51, Fig. 7. Loosely mounted on the operating shaft 48 adjacent the center thereof is a sleeve 241 which is coupled and uncoupled to the shaft 48 by means of a grab clutch indicated in general by reference numeral 252. The clutch 252 comprises a ratchet member 256 fixed for rotation therewith to the shaft 48 and another ratchet member 249 slidably mounted on the sleeve 241 to bring ratchet teeth thereon into and out of engagement with similar teeth on the rotating member 256.

Loosely mounted on the operating shaft 48 adjacent the left hand end thereof is a selector cam sleeve 264. The selector cam sleeve 264 has a flange at its left hand end and clamped thereagainst intermediate with spacers 269 is a stop-arm 266, a series of five progressively notched selector cams 267 and a print mechanism trip cam 268. The above mentioned cams and stop arm are clamped in fixed position on the sleeve 264 by a nut 272 in threaded engagement with the threaded right hand end of the sleeve. The right and left hand ends of the sleeve 264 have radial keys formed thereon which are adapted to engage radial keyways in two friction disc members 273 and 274 respectively, loosely mounted on the shaft 48 at the ends of the sleeve. Abutting the left hand face of the disc member 274 is a friction element 277, such as a felt disc, which has abutting its left hand face a friction disc member 276. The disc member 276 has a threaded portion extending from the center thereof which is threaded into the left hand end of the shaft 48 for rotation therewith. The right hand face of the disc member 273 abuts a friction element 278 which in turn abuts on its right hand face a friction disc 261. The disc 261 has projections 262 extending along the axis of the shaft 48 which engage recesses 263 in a collar 257 threaded on the shaft 48 for rotation therewith. A disc member 258 also threaded on the shaft 48 serves as a lock for the collar 257 and holds it in position on the shaft. Surrounding the collar 257 is a helical spring 279 which exerts a force toward the right and maintains the friction disc members 261, 273, 274 and 276 in frictional engagement with their associated friction elements 277 and 278. The disc members 261 and 276, as hereinbefore described, constantly rotate with the shaft 48 and by means of the friction elements 277 and 278 in frictional engagement therewith, tend to rotate the selector cam sleeve 264 and its associated elements with the shaft 48. However, the cam sleeve 264 is normally held at rest in its normal rest position by means hereinafter described.

Figure 2:
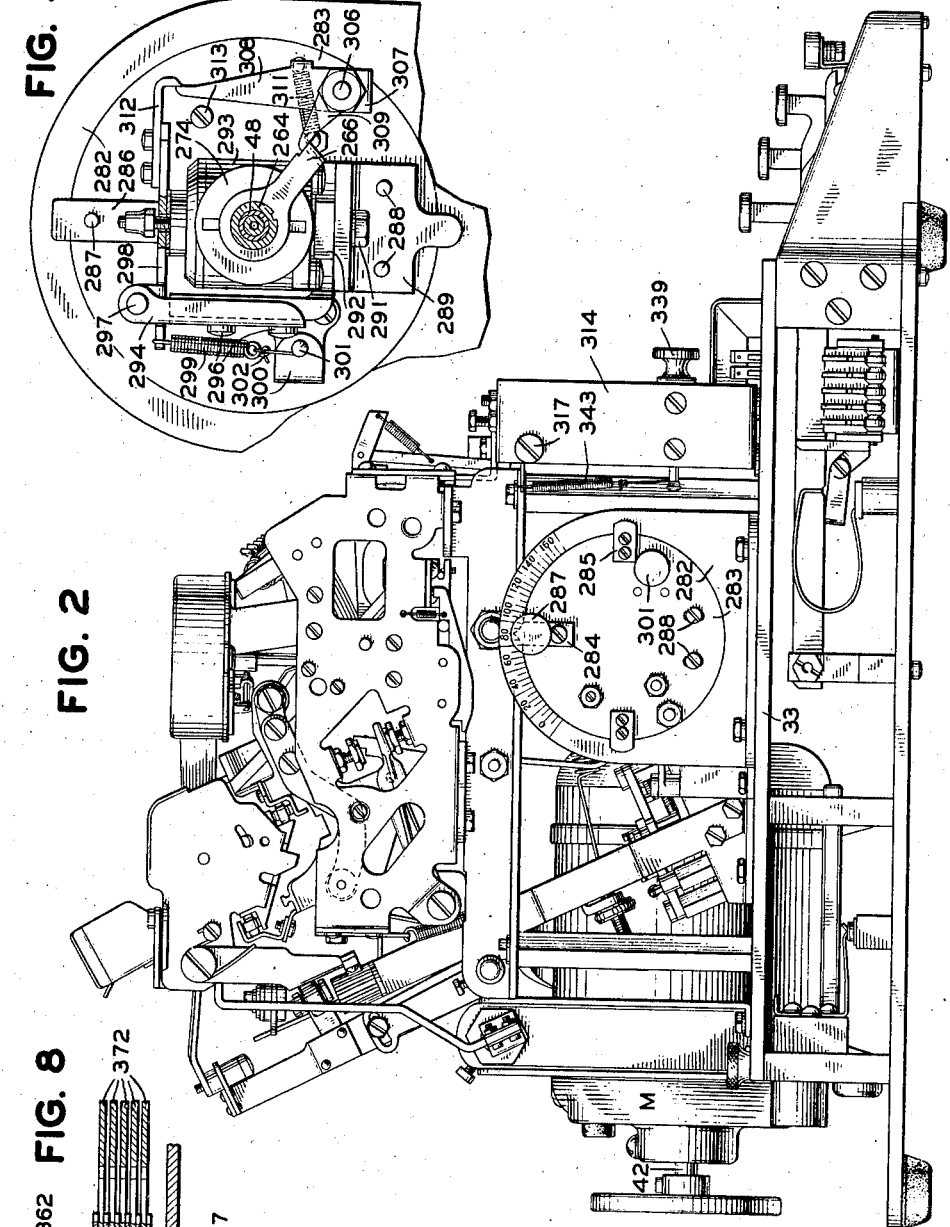
Fig. 2 is a left hand elevational view of the selector mechanism and the associated printer.

In the selector mechanism two magnets are employed, a start magnet and a selector magnet. The start magnet controls the starting of the selector while the selector magnet controls the selective operation thereof. Although separate start and selector magnets are employed, a single magnet could be adapted to perform both functions. Referring to Figs. 2, 3 and 5, the operation and arrangement of the start magnet will now be described. Secured adjacent the center of the left hand edge of the horizontal plate 33, which serves as the base of the associated printer, is a start unit mounting bracket 282. The bracket 282 has a circular opening in the vertical part thereof and adapted to rotate in this opening is a circular disc 283. The disc 283 is held in the opening in the bracket 282 by small metal ears 285 attached to the disc. Two members 284 and 286 affixed to the disc 283 on opposite sides thereof in conjunction with a thumb nut 287 clamp the disc in various rotative positions in the bracket 282. Attached by screws 288 to the disc 283 is a right angle bracket 289 upon which is mounted by a screw 291 a magnet yoke 292 and the start magnet 293. An armature bracket 294 is secured to the yoke 292 by screws 296 and pivotally carries in the upper end thereof an armature pivot rod 297 upon which is pivotally mounted the armature 298. A retractile spring 299 is attached to the left hand end of the armature 298 as shown in Fig. 5 and tends to move the armature against the magnetic action of the magnet 293. Secured to the disc 283 is a bracket 300 which has pivotally supported therein an armature spring adjusting screw 301. A cord 302 is attached to one end of this spring 299 and is adapted to wind up about the screw 301 to vary the tension of the spring 299. A spring 303, Fig. 3, coiled about the adjusting screw 301 exerts a pressure between a collar 304 thereon and the bracket 300 to prevent the spring 299 from unwinding the cord 302 from around the screw 301. Pivoted on a stud 306, Figs. 3 and 5, extending horizontally from the disc 283 is a double arm trip lever 307 having two arms 308 and 309 extending therefrom which controls the release of the selector cam sleeve 264 in a manner hereinafter described.

In the preferred embodiment of the invention the rest impulse of the signalling code energizes the start magnet 293 and causes a hook member 312 attached to and extending from the right hand end of the armature 298, as shown in Fig. 5, to be in engagement with the upper end of the arm 308 of the trip member 307 as the stop arm 266 on the selector cam sleeve 264 engages the arm 309 of the trip member. Thus the rotation of the stop arm 266 and the selector cam sleeve 264 is prevented and they are held in their normal rest position as long as the start magnet 293 remains energized. At certain times, as hereinafter described, when the stop arm 266 is not engaged with the arm 309, a spring 311 rotates the trip member 307 in a counter-clockwise direction to bring the arm 308 into engagement with a pin 313 extending from the disc 283. In this position of the trip member 307 the arm 309 is in the path of the end of the stop arm 266 and will be engaged therewith near the end of the revolution of the stop arm.

The operation and arrangement of the selector magnet will now be described and referring to Figs. 1, 2, 3 and 6 an inverted U shaped selector unit mounting bracket 314 is adjustably secured to the left front section of the printer base plate 33 by screws 316 extending through slotted holes 315 in the bracket 314. Two hollow ended screws 317 and 318 are located adjacent the upper sections of the sides of the bracket 314 and pivotally mounted on shoulders at the inner ends of the screws is a U shaped selector magnet cradle 319. Attached to the horizontal section of the cradle 319 by screws 321 is a magnet yoke 322 and two electro-magnetic coils 323 which comprise the selector magnet. Pivotally supported between the ends of the screws 317 and 318 is an armature pivot rod 324 which has affixed thereto an armature lever 326. Secured to the armature lever 326 is a member 327 in operative relation with the pole pieces of the electro-magnets 323. Extending from the rear of the armature lever 326 are sections 328 and 329, the purposes of which will hereinafter be described. Secured between the vertical sections of the selector unit mounting bracket 314 is a member 331, Figs. 1 and 4, which has extending horizontally therefrom a threaded stud 332. The stud 332 extends through an elongated hole 333 in a depending section 334 of the cradle 319 and has a thumb nut 336 threaded thereon. A spring 337 is coiled about the stud 332 and holds the depending section 334 of the cradle against the thumb nut 336 and by adjusting the thumb nut 336 on the stud 332 the magnet cradle 319 may be rocked. In this manner the air gap between the pole pieces of the magnets 323 and the member 327 may be varied without changing the position of the armature lever 326. Also supported in the member 331 is a rod 338 with a thumb nut 339 secured to one end for rotation therewith. The rod 338 is pivotally supported in the member 331 and has a spring 341 coiled thereabout to prevent the rod from turning freely. A cord 342 is adapted to wind up about the rear end of the rod 338 and in so doing vary the tension of a retractile spring 343 which is attached to the armature lever extension 328. Two adjustable screws 344 and 346 in the selector magnet mounting bracket 314 are adapted to limit the movement of the armature lever 326.

Figure 8:
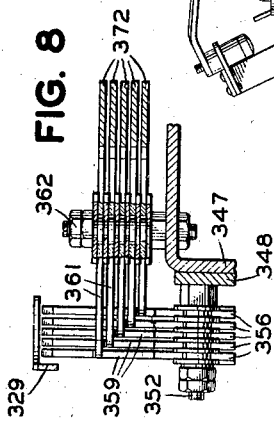
Fig. 8 is a vertical sectional view taken substantially on the line 8—8 of Fig. 3 showing the latches operated by the selectors.

Attached to the front center of the printer base 33 is an inverted U-shaped permutation or selector bar mounting bracket 347, Figs. 1 and 3. A selector lever mounting plate 348 is adjustably secured to the left hand side of the bracket by screws, not shown, extending through clearance holes in the plate 348. Extending horizontally from the plate 348 are three studs 349, 351 and 352, Fig. 6, on which are a series of six selector lever guide members 354. The guide members 354 are separated and spaced along the studs by spacers 353 and the spacers and guide members are all clamped together on the studs by nuts such as 355, Fig. 3, in threaded engagement with the ends of the studs. In the spaces formed between the guide members 354 by the spacers 353 are a group of five selector levers 356 which are pivotally mounted on the spacers 353 on the stud 351. The selector levers 356 are slightly thinner than the spacers 353 and therefore the selector levers are movable between the guide members 354. Individual springs 357, Fig. 6, are attached to the selector levers 356 and tend to rock them in a counter clockwise direction and normally keeps the ends of a rightwardly extending arm 358 in engagement with the periphery of associated selector cams 267. Each of the five selector levers 356 are in the same vertical plane as an associated one of the selector cams 267 and are normally in engagement therewith. Each of the selector levers 356 has a leftwardly extending projection 359 extending from the vertical arms thereof which are adapted to operatively engage as will be hereinafter described, an associated permutation bar latch 361. The permutation bar latches 361, Figs. 3 and 8, are pivotally supported on a stud 362 extending vertically from the bracket 347. Individual springs 366 attached to the latches 361 normally actuate them so that they latch the permutation bars 372 in a normal latched position. The permutation bars 372, Figs. 1, 3 and 9, are supported by studs, such as 367, extending vertically from the top of the bracket 347. Elongated slots 373 in the permutation bars allow them to be moved transversely of the machine. The normal position of the permutation bars 372 is to the right, as shown in Figs. 1 and 3, and they are held there by the latches 361 against the action of individual springs, such as 376, Fig. 9, engaging the right hand end of the permutation bars and tending to slide them to the left, Figs. 1 and 3. Each of the permutation bars 372 has formed on the front edge thereof a different arrangement of notches such as 380, and as is well known in the art and fully described in the above mentioned Noxon et al. application, the notches are so arranged that for various combinations of settings of the permutation bars, a notch in each one of the bars will be in vertical alignment with a notch in each of the other bars. Following the positioning of the permutation bars a series of drop-in bars 406, Figs. 1, 3 and 9 approach the permutation bars and the one in alignment with the aligned notches pivots a hooked member such as 441 beneath a cyclically operable bail, not shown, to control the operation of the printer.

The operation of the selector mechanism in conjunction with the receipt of a code combination of line conditions will now be described. Let it be assumed that a code combination representing the letter M is received and such a combination is composed of a spacing start impulse followed by two spacing character selecting impulses then three marking character selecting impulses and terminated by a marking rest impulse.

The normal condition of the line is closed and therefore during such times the start magnet 293 and the selector magnet 323 are in an energized condition. On the receipt of the start impulse which is an open line condition and precedes each character selecting group of impulses, the start and selector magnets are deenergized. As the armature lever 298, Fig. 5, of the start magnet 293 moves to its deenergized position the hook member 312 attached thereto is disengaged from the upper end of the arm 308 of the trip member 307. The stop-arm 266, as hereinbefore described, is normally tending to rotate and on the release of the trip member 307 the stop-arm 266 rocks the trip member in a clockwise direction until the arm 309 is disengaged from the stop-arm 266. The spring 311 attached to the trip member 307 thereupon pivots it in a counter-clockwise direction to bring the arm 308 against the stop pin 313 in which position the arm 309 is in the path of the stop-arm 266 to bring the same to a stop at the completion of its current revolution as will be hereinafter described. Thus the receipt of a spacing or open line start impulse releases the stop-arm 266 and the selector cam sleeve 264 for rotation with the shaft 48 through the action of the friction elements described.

The shaft 48 is adapted to rotate at a predetermined speed which is such in conjunction with the speed of the signaling impulses that the selector cam sleeve 264 will complete a revolution during the receipt of the marking or closed line rest impulse following each code combination group. After the selector cam sleeve 264 has rotated approximately three-fourteenths of a revolution from its normal rest position, a notch 381 in the first selector cam 267 rotates into operative relation with the end of the rightwardly extending arm 358 of the first selector lever 356. At this time the attached spring 347 is allowed to rock the first selector lever 356 in a counter-clockwise direction and the amount of rocking of the selector lever is determined by the position of the armature lever 326 at this time. If the armature lever 326 at this time happens to be in its spacing or retracted position, a beveled portion 382 on the upper end of the first selector lever 356 engages with a beveled baffle section 383 on the armature lever extension 329. This engagement prevents further rocking of the selector lever 356 in a counter-clockwise direction and also prevents any movement of the armature lever 326 while the two beveled surfaces 382 and 383 are in engagement. The engagement of the beveled surfaces 382 and 383 occurs after the selector lever has pivoted only a slight amount and the pivoting movement thereof is not sufficient for the leftwardly extending projection 359 to engage its associated permutation bar latch 361. Shortly after the end of the arm 358 enters the notch 381 in its associated selector cam 267, the notch rotates out of operative relation therewith and in doing so pivots the selector lever 356 in a clockwise direction back into its normal position. This disengages the beveled surfaces 382 and 383 on the selector lever and baffle member respectively, whereupon the armature lever 326 may move to a marking position due to the energization of the relay 323 if the next signaling impulse happens to be marking. If the armature 326 had been in an energized or marking position as shown in Fig. 6, in which position the beveled section 383 on the armature lever extension 329 is above the upper end of the selector lever 356 when the notch 381 rotated into operative relation with the selector 356, the spring 357 would have been permitted to pivot the selector lever until the end of the arm 358 entered to the full depth of the notch 381 in the selector cam 267. Obviously while the upper end of the selector lever 356 is beneath the baffle member 383, movement of the armature lever 326 to its spacing position is prevented.

As the selector lever 356 rocks in a counter-clockwise direction to the full depth of the notch 381 in its associated selector cam 267, the projection 359 thereon engages its associated permutation bar latch 361. This pivots the latch 361 a slight amount and disengages it from its associated permutation bar 372 whereupon its associated spring 376 slides it to the right as seen in Fig. 9, which shows only one of the selector levers and associated elements relative to one another.

From the above it is evident that the position of the armature lever 326 at the time a selector lever 356 comes into operative relation with the notch 381 on its associated selector cam determines the amount that the selector lever will be allowed to pivot in a counter-clockwise direction. The amount that a selector lever 356 pivots determines whether or not a permutation bar latch 361 is operated or left in the normal position which in turn controls the release of an associated permutation bar 372. The selector unit mounting 314 bracket is adjustable relative to the selector levers 356 and consequently the beveled section 383 of the armature lever 326 can be moved relative to the selector levers 356. Thus the length of time that the beveled section 383 may be engaged with the beveled section 382 of a selector lever can be varied.

The orientation or rotatable adjustment of the start magnet unit comprising the disc 382, the attached magnet 293 and the trip member 307 relative to the stop arm 266 compensates for variations in the length or effectiveness of the start impulse and permits it to be adjusted so that the selector levers 356 are engageable with the notches 381 in their associated selector cams 267 during predetermined portions of their associated selecting impulses. The predetermined portion of a selecting impulse in which it is preferred to operate an associated selector lever is the mid-portion relative to the beginning and ending of a selecting interval and it is determined by the orientation of the start magnet 293 and its associated members. The outer end of the clamping member 284 is pointed and cooperates with a scale on the face of the bracket 282 whereby the extent or amount of orientation can be determined. As it was assumed that selecting impulses representing the character M was received on the selector magnet 323, the impulses being spacing, spacing, marking, marking and marking, the first two permutation bars 372 from the top will be left in their normal or spacing positions and the lower three permutation bars will be unlatched and move to their operating or marking position.

As hereinbefore described the start impulse of each code group causes the release of the selector cam sleeve 264 which rotates at such a speed to bring notches 381 in the cams into operative relation with their associated selector levers 356 during associated signaling impulses and completes its revolution during the receipt of the marking rest impulse. This rest impulse energizes the start magnet 293 and places the hook member 312 on the armature 298 in the path of the end of the arm 308 of the trip member 307. Therefore, when the stop-arm 266 has nearly completed a revolution it engages the arm 309 of the trip member 307 and rotates it a slight amount in a clockwise direction until the end of the arm 308 engages the hook member 312. Thus the selector cam sleeve 264 is brought to rest in its normal rest position at the end of each revolution.

The selector cam sleeve 264 in addition to cooperating with the positioning of the selector levers 356 also times the release of the printer operating cam sleeve 241. The release of the cam sleeve 241 is accomplished by the print operating cam sleeve release cam 268 engaging and pivoting a trip lever 384 during each revolution of the selector cam sleeve 264. As the trip lever 384 pivots, the arm 392 is disengaged from the slidable collar 249 on the sleeve 241 whereupon a spring 394 slides the collar 249 to the left and engages its teeth with similar teeth on the disc 256 rotating with the main operating shaft 48. Near the end of a revolution of the sleeve 241 the arm 394 of the trip lever 384 disengages the collar 249 from the disc 256 and brings the sleeve to rest in its normal rest position in the manner well known in the art. During the rotation of the operating cam sleeve 241, the cams thereon through appropriate mechanism performs the various printer operations and one of these operations is the reset of the permutation bars 372 to their normal position. This is accomplished some time after the selective operation of one of the drop-in-bars 406, by a cam surface 395 which extends axially along the sleeve 241 engaging and pivoting a lever 475, Fig. 3, in a counter-clockwise direction. This pivoting of the lever 475 allows one end to engage rearwardly extending projections 490 on the permutation bars 472 that happen to be in their left hand positions and move them toward the right into their normal position where they are latched by their associated latches 361. Thus all the permutation bars 372 are returned to their normal positions ready to be released by their associated latches 361 when selectively operated by the selector levers 356 in accordance with the next received code group of impulses.

While this invention has been described and shown in but one form, it is obvious that various modifications of the apparatus may be made without departing from the spirit or essential attributes of the invention, and it is desired, therefore, that only such limitations shall be placed thereon as are imposed by prior art or are specifically set forth in the appended claims.

What is claimed is:

1. A selecting mechanism comprising a plurality of selector members, said selector members having knife-edged portions, means for moving said selector members in succession, an electro-magnet, a member controlled thereby to be selectively positioned to one side or the other of said knife-edged portions and in one position restricting movement of said selector members, a plurality of notched selector bars controlled by unrestricted movement of said selector members to selectively align the notches of said bars, printing means and means movable into said aligned notches for controlling said printing means.

2. In a telegraph apparatus, a plurality of rotary cams, a plurality of selector members released for movement in succession by rotary movement of said cams, a magnet, means controlled by said magnet to selectively interfere with the movement of said members, means for preventing movement of said magnet controlled means while interfering with the movement of said selector members, a plurality of notched selector bars selectively positioned in succession in accordance with the movement of said selector members to produce selective alignments of the notches in said bars, and a plurality of print control members selectable by the alignment of the notches in said selector bars.

3. In a printing telegraph receiver, a plurality of selectors arranged to be successively operated, and electro-magnet responsive to received code combinations of impulses, means operable by said electro-magnet for selectively restraining said selectors from complete operation and means including said selectively restrained said selectors for establishing locking engagement thereof with said electro-magnetically operated means.

4. In a printing telegraph receiver, a plurality of selectors, spring means normally urging said selectors into operation, means for normally restraining said selectors from operation, said means being arranged to successively release said selectors for operation, an electro-magnet responsive to received code combinations of impulses, means operable thereby in timed relation with said release of said selectors for selectively restraining said selectors from operation, means operable by said selectors when restrained from operation by said electro-magnetically operated means for restraining operation of said electromagnetically operated means, a plurality of notched bars, means for operating said bars selectively in succession in accordance with unrestrained movement of said selectors to align the notches thereof and print control means movable into said aligned notches.

5. In a selector mechanism, a set of permutation members having a normal and a selected position, a set of latches associaated with said permutation members, one for each permutation member and normally holding said permutation members in their normal positions, a rotary sleeve normally at rest and tending to rotate, an electromagnet, means controlled by said electro-magnet for releasing said sleeve for rotation, a second electro-magnet, means controlled by said second electro-magnet whereby said latches are selectively actuated in accordance with received signals and means for selectively positioning permutation members associated with said selectively actuated latches.

6. In a selecting mechanism, a set of notched selector members having a normal and a selected position, means for biasing said selector members to their selected position, a set of latches one for each of said selector members for retaining said associated selector members in their normal positions, a set of selector levers one for each of said latches for directly and selectively operating said latches, a rotary member, means comprising said rotary member for sequentially actuating said selector levers in timed relation to received line impulses, an electro-magnet responsive to received line impulses, and a baffle member common to all of said selector levers operable by said electro-magnet, adapted to prevent or allow said selector levers to operate said latches in accordance with received line impulses.

7. A selecting mechanism comprising a plurality of selector members, each of said selector members having a beveled edge portion, means for moving said selector members in succession, a magnet controlled member having an oppositely beveled edge portion and selectively positioned to one side or the other of the beveled edge portion of said selectors whereby in one position of the magnet controlled member the beveled edge portion of the selectors and magnet controlled member engage to restrict movement of said selectors and in the other position of said magnet controlled member the movement of said selectors is unrestricted, a plurality of notched selector bars controlled by unrestricted movement of said selector members to selectively align the notches of said bars, printing means and means movable into said aligned notches for controlling said printing means.

8. In a selector apparatus, an electro-magnet responsive to received code combinations of impulses, an armature therefor, said armature being unimpeded during the beginning and ending of each variable impulsing period for movement in accordance with the energization of said electromagnet, means whereby the movement of said armature is impeded during substantially the midportion of said variable impulsing periods, and means for varying the length of the time wherein the movement of the armature is impeded.

9. In a selector apparatus, an electro-magnet responsive to received code combinations of impulses, an armature therefor, said armature being unimpeded during the beginning and ending of each variable impulsing period for movement in accordance with the energization of said electromagnet, means whereby the movement of said armature is impeded during substantially the midportion of said variable impulsing periods, means for shifting the periods during which movement of said armature is impeded relative to the beginning and ending of said impulsing period, and means for varying the length of the time in which the movement of the armature is impeded.

10. In a selecting mechanism, a set of notched selector members having a normal and a selected position, means for biasing said selectors to their selected position, a set of latches for retaining said selector members in their normal position, a set of selector levers adapted to directly operate said latches, means for cyclicly actuating said selector levers in synchronisms with received signals, a baffle member for said selector levers whereby the operation of said latches is prevented, means for operating said baffle member in response to received signals and means for preventing the operation of said baffle member when baffling the operation of said selectors.

PAUL A. NOXON.
SAMUEL W. ROTHERMEL.
FRANK J. MAUS.
EMERSON J. SORTORE.